Sept. 12, 1950 W. A. BOCKISCH 2,521,821
MAGNETIC CHUCK FOR A PART HAVING TWO MAGNETIZABLE ZONES
Filed Feb. 16, 1946 3 Sheets-Sheet 1
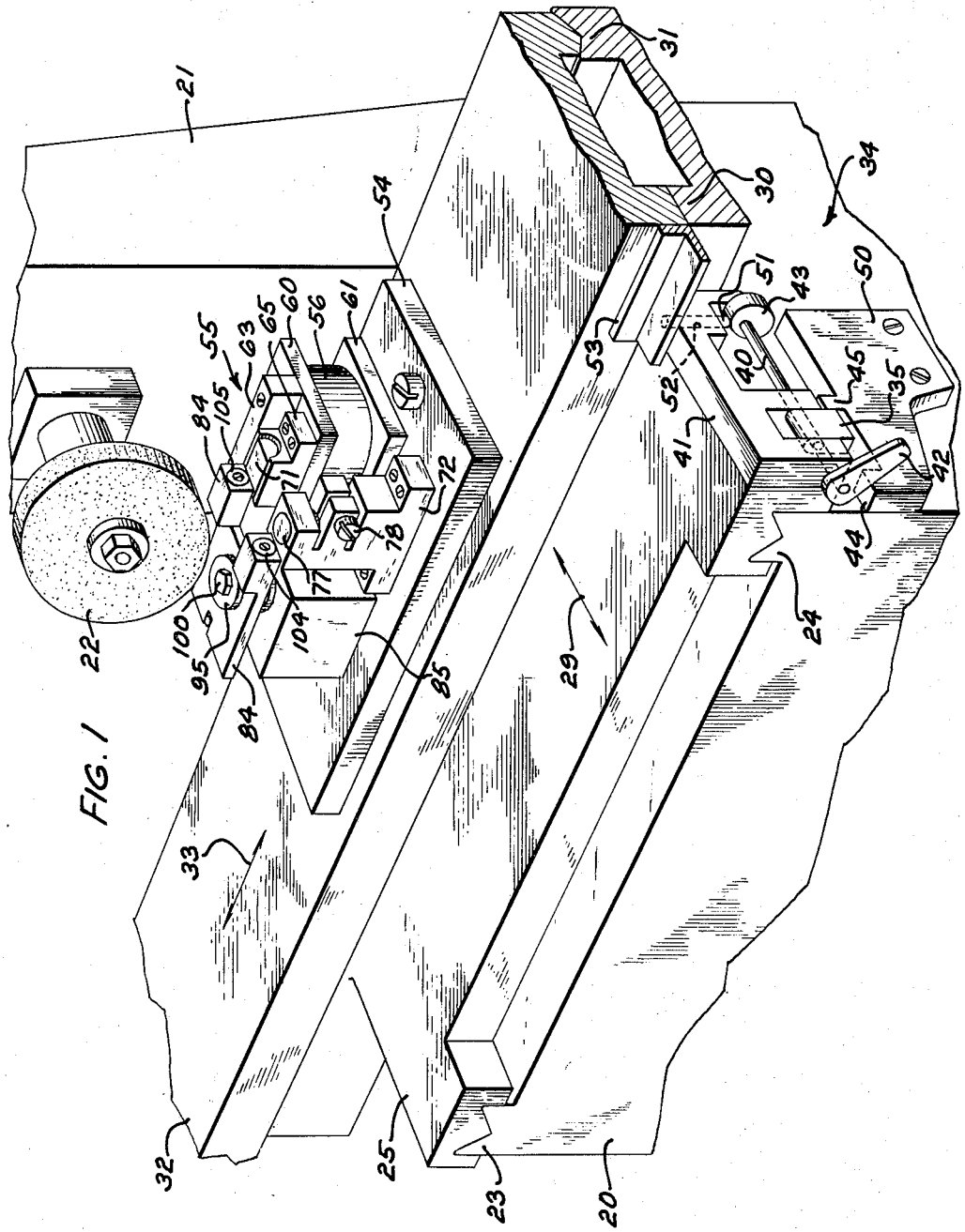
FIG. I
INVENTOR
W. A. BOCKISCH
BY *E. F. Kane*
ATTORNEY

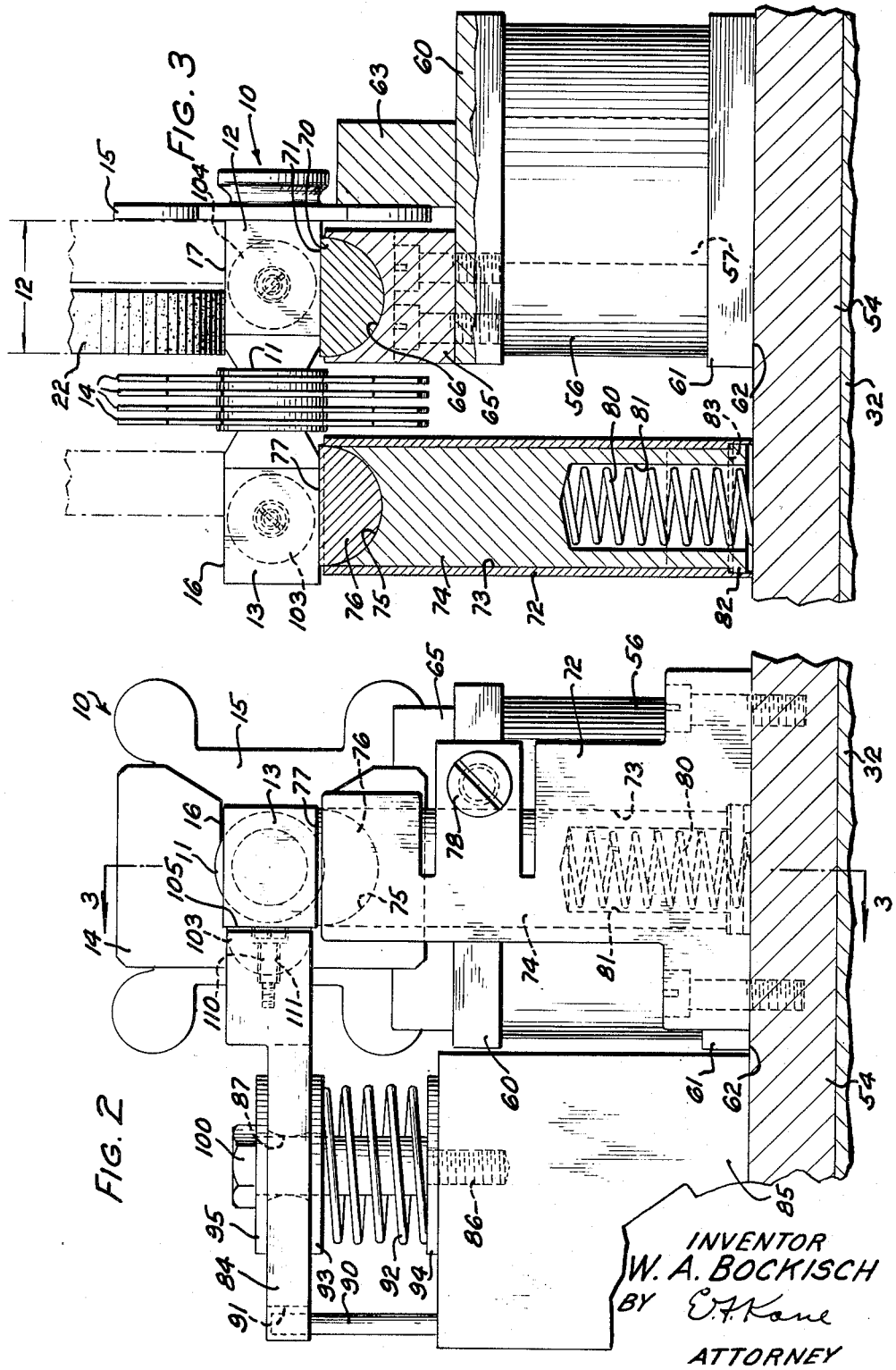
Sept. 12, 1950 — W. A. BOCKISCH — 2,521,821
MAGNETIC CHUCK FOR A PART HAVING TWO MAGNETIZABLE ZONES
Filed Feb. 16, 1946 — 3 Sheets-Sheet 2
INVENTOR
W. A. BOCKISCH
BY E. F. Kane
ATTORNEY

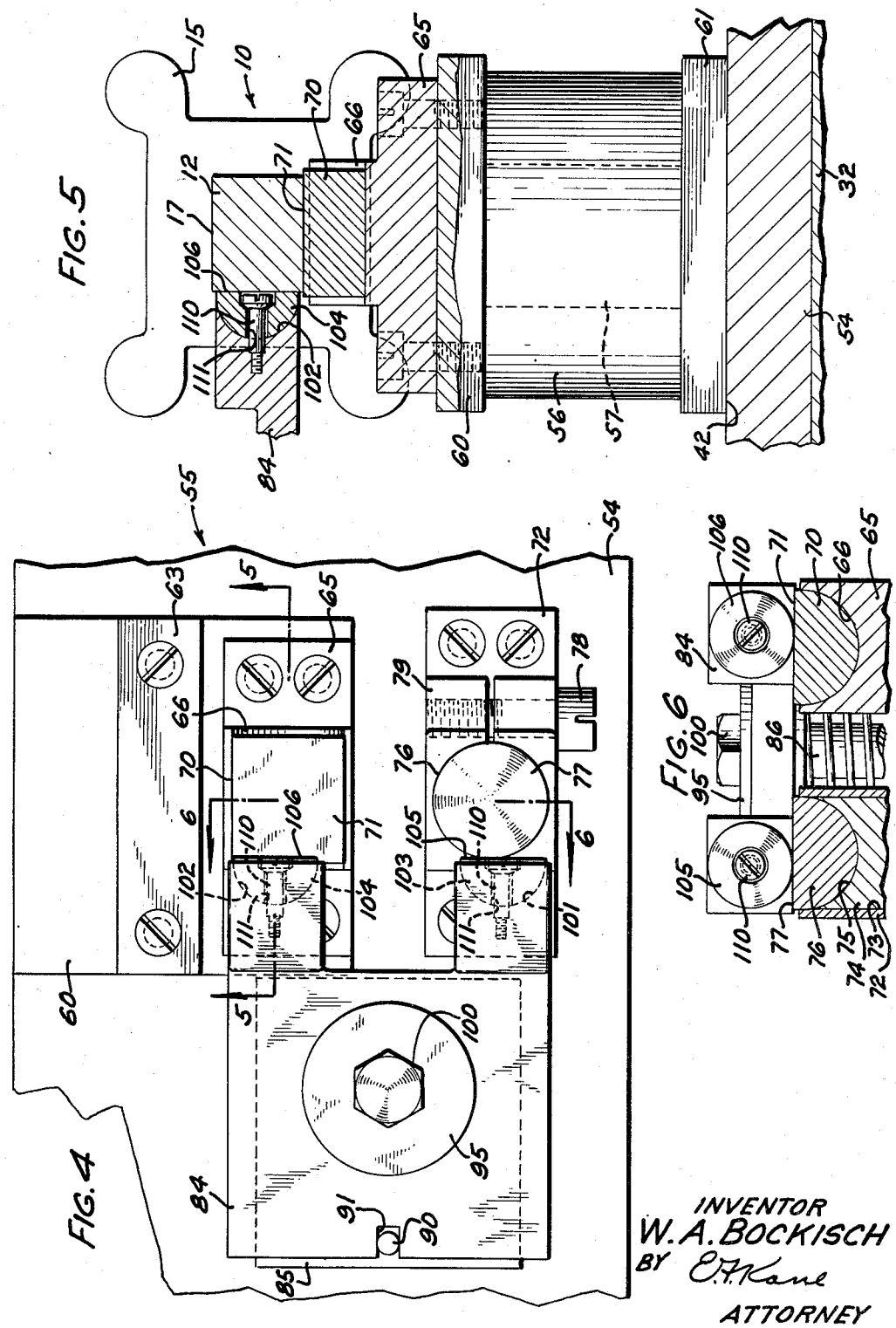

Patented Sept. 12, 1950

2,521,821

UNITED STATES PATENT OFFICE 2,521,821

MAGNETIC CHUCK FOR A PART HAVING TWO MAGNETIZABLE ZONES

Walter A. Bockisch, Elmhurst, Ill., assignor to Western Electric Company, Incorporated, New York, N. Y., a corporation of New York Application February 16, 1946, Serial No. 648,160

4 Claims. (Cl. 175—367)

This invention relates to an article working apparatus, and more particularly to a grinding apparatus having self-aligning chucking means.

In the manufacture of some electrical apparatus, for example, magnetron tubes, magnetic and non-magnetic parts are welded or brazed together. In these welding or brazing operations the parts become displaced with respect one to another in spite of attempts to maintain them in fixed positions and accordingly some of the parts are purposely made oversize and after assembly are ground to the desired size and contour. In the displacement occurring in the welding operations, surfaces which should be maintained in a predetermined relation one to another are frequently displaced and in the grinding operation considerable difficulty has been experienced in providing means for holding the articles during the grinding in such manner that undue stresses will not be applied to the assemblage.

It is an object of the present invention to provide an article working apparatus capable of holding articles in position to be worked without applying undue stress to the articles.

In accordance with one embodiment of the invention as applied to an apparatus for grinding surfaces of certain elements of magnetron tubes to the desired contour, self-aligning pole pieces are provided in spaced relation one to another for engaging spaced areas of the article to be ground in such manner that the faces of the pole pieces will align themselves with non-parallel surfaces of the article while other surfaces of the article are being ground to the desired contour. The self-aligning pole faces form part of the magnetic chucking device including a self-aligning by-pass element mounted upon a table movable longitudinally and transversely beneath a grinding element and positionable to present various surfaces of the article to the grinding wheel. In order to protect certain parts of the article from contact with the grinding wheel during the grinding operation, a locking device limits the distance the table may be moved transversely while permitting free longitudinal movement. In another position the locking device permits unlimited transverse movement of the table while the longitudinal movement is restricted.

A complete understanding of the invention will be had by reference to the following detailed description taken in conjunction with the accompanying drawings, wherein Fig. 1 is a perspective view of a preferred embodiment of the invention;

Fig. 2 is a front view of a portion of the apparatus showing an article held in position by the magnetic chuck;

Fig. 3 is a sectional view of the apparatus taken substantially on the line 3—3 of Fig. 2 showing the relationship of the grinding wheel to the article being worked and the chuck, the article and the wheel being shown in elevation;

Fig. 4 is a plan view of a portion of the apparatus shown in Fig. 1 and illustrating the relationship of the by-pass element to the movable pole pieces.

Fig. 5 is a sectional view of the apparatus taken on the line 5—5 of Fig. 4 with part shown in elevation; and Fig. 6 is a detailed view of a portion of the apparatus taken on the line 6—6 of Fig. 4.

The embodiment of the invention disclosed herein comprises an apparatus for grinding an article 10 in which distortion or deformation may not be tolerated, and which comprises a central section 11 made of non-magnetic metal secured, for example, by brazing or welding to magnetic metal end blocks 12 and 13. A plurality of fins 14 extend from the central section 11 and an irregular shaped flange 15 is secured to the end of the block 12. The article 10 is magnetically held while surfaces 16 and 17 thereon are ground until both are in a predetermined plane.

It will be seen from the drawings that the apparatus is provided with a base 20 having an upright standard 21 adjacent the upper end of which is mounted a grinding wheel 22 that may be driven by any suitable means (not shown). The base 20 is further provided with ways 23 and 24 upon which a platform 25 is slidably mounted to guide the platform during transverse positioning movement thereof in the directions indicated by the double-headed arrow 29. Ways 30 and 31 at right angles to the ways 23 and 24 are provided on the platform 25 to slidably support and guide a table 32 longitudinally movable in the directions indicated by the double-headed arrow 33.

During the grinding operation for which this apparatus was specifically designed, the transverse movement of the apparatus in the directions indicated by the arrow 29 is limited while the longitudinal movement in the directions indicated by the arrow 33 is unrestricted within the limits of the machine. These movements are under the control of a locking mechanism 34 comprising a locking member 35 fixed to a shaft 40 which is journalled in a plate 41. A manually operable lever 42 is secured to one end of the shaft 40 while an eccentric cam 43 is fixed to the other end thereof with its greatest radius pointing in the same direction as the locking member 35. When in a downward position, the locking member 35 is limited in its area of travel by stops 44 and 45 on a plate 50 fixed to the base 20. Directly above the cam 43 and at right angles to the shaft 40 a pin 51 is slidably positioned in an aperture 52 formed in the plate 41. While the article 10 is within range of the grinding wheel 22 the upper end of the pin 51 abuts an angle member 53 secured to the table 32, in which position the pin 51 is unable to move upward thereby restricting the movement of the cam 43 and holding locking member 35 in its downward position. However, when the table 32 has been moved to the right (Fig. 1) far enough to uncover the pin 51, the lever 42 may be operated to rotate the locking member 35 upward and out of range of the stops 44 and 45 thus permitting transverse movement along the directions indicated by the arrow 29 while the longitudinal movement of the apparatus is restricted by the extension of the pin 51 into the path of the angle member 53.

Secured to the table 32 is a plate 54, made of magnetic material, which serves as a base for a magnetic chuck 55. A suitable electromagnet 56 with a core 57 having two pole pieces 60 and 61 is mounted on the plate 54 in such a manner that a face 62 of the pole piece 61 intimately engages the plate to provide a magnetic path from the pole through the plate. A stop or positioning member 63 is secured to the pole piece 60 to aid in aligning the article 10 being worked on as will be described more in detail hereinafter. The pole piece 60 is provided with an irregular shaped magnetic extension 65 which has formed therein a substantially semi-circular channel 66 (Fig. 3) to slidably accommodate a substantially semi-cylindrical chucking member 70 made of magnetic material and having an article engaging face 71.

Mounted on the plate 54 adjacent to the electromagnet 56 is a clamping fixture 72 having a circular bore 73 (Figs. 2 and 3) extending vertically therethrough to slidably accommodate a cylindrical member 74 with a cup-shaped socket 75 at its upper end to support a substantially hemispherical chucking member 76 having an article engaging face 77. The height of the member 76 may be adjusted by raising or lowering the member 74 and clamping it at any desired height by means of a clamping screw 78 which threadedly engages a split clamping section 79 of the fixture 72. To facilitate adjustment, a helical compression spring 80, disposed in a hollow 81 formed in the lower end of the cylindrical member 74 continuously urges the member 74 upward, the upward displacement, however, reaching its limit when an annular flange 82 at the lower end of the member 74 abuts a circular shoulder 83 formed by an enlargement of the lower end of the bore 73. To provide a magnetic path from the magnet to the member 76, the fixture 72, the member 74 and the member 76 should be made of magnetic material.

When the article 10 is placed in the chuck 55 for the grinding operation, the end blocks 12 and 13 of the article 10 lie on the block 70 and the member 76, respectively, and the flange 15 is moved to engage the stop or positioning member 63 thus to locate the article in proper position on the chuck. After the electromagnet 56 is energized, the chucking members 70 and 76 orient themselves so that the faces 71 and 77 intimately engage, by magnetic attraction, the end blocks 12 and 13, respectively. The magnetic attraction between the chucking members 70 and 76 and the end blocks 12 and 13 of the article is increased by completing the magnetic path around the non-magnetic central portion 11 of the article through a magnetic by-pass element 84, made of magnetic material, which is resiliently mounted on a non-magnetic support 85 by means of a bolt 86 which passes through a double-cone shaped aperture 87 formed in the body of the by-pass element and is threaded into the support 85. The double-cone shape of the aperture 87 aids in alignment by permitting a slight universal movement of the by-pass element. Rotation of the by-pass element 84 about the bolt 86 is prevented by a guide pin 90, the upper end of which engages the walls of a slot 91 formed in the by-pass element 84 and the lower end of which is secured to the support member 85. The by-pass element 84 is urged resiliently upward by a helical compression spring 92 which encircles the bolt 86 between the by-pass element 84 and the top of the support member 85, the spring being spaced from the by-pass element and the support by washers 93 and 94, respectively, while a washer 95 serves as an abutment between the by-pass element and the head 100 of the bolt 86.

The by-pass element 84 is provided with two cup-shaped sockets 101 and 102 which accommodate substantially hemispherical members 103 and 104 made of magnetic material having article engaging faces 105 and 106 adapted to be automatically oriented to intimately engage the article and complete the magnetic circuit. When the by-pass element is not magnetically energized, the members 103 and 104 are held in place by headed bolts 110 (Figs. 2 and 4) which pass through shouldered apertures 111 formed in the members and are threaded into the body of the by-pass element. The apertures 111 are slightly larger than the diameter of the bolts to effect a universal joint between the members 103 and 104 and the sockets 101 and 102, respectively.

To obviate the possibility of damaging the fins 14 and the flange 15 while the surface 17 is being ground, the chuck 55 is restricted to just enough transverse movement to permit the surface to be ground. Excessive transverse movement is prevented by the stops 44 and 45 (Fig. 1) secured to the plate 50, which limit the movement of the locking member 35 when it is in a downward position (as shown) between the stops 44 and 45. In this position the longitudinal movement of the chuck 55 is substantially unrestricted.

Obviously, to grind the other surface 16, it is necessary to transversely shift the chuck and the article a great enough distance to bring the surface 16 within range of the grinding wheel. This is accomplished by moving the table 32 to the right (Fig. 1) until the angle member 53 no longer obstructs the pin 51 thereby freeing the cam 43 and allowing the shaft 40 to be operated counterclockwise to raise the locking member 35, In this position the article 10 and the chuck are out of the range of the grinding wheel and the shift may be made without damaging the article 10 by operating the lever 42 to turn the cam 43 counterclockwise (Fig. 1), thereby camming the pin 51 and forcing it upward and into the path of the angle member 53, thus restricting the longitudinal movement of the table 32 while permitting free transverse movement of the table to shift the chuck so as to bring the surface 16 in line with the grinding wheel. The lever 42 is then operated to bring the locking member 35 into a downward or locking position and to permit the pin 51 to drop, thereby freeing the table 31 for longitudinal movement to the left (Fig. 1) to carry the surface 16 under the grinding wheel. In this position transverse movement is limited in one direction by the stop 45. No limitation is imposed in the other direction since there are no extensons or projections of the article 10 that could be damaged by movement in this direction.

In the operation of this apparatus the table 32 is moved to the right (Fig. 1) to a point just beyond the position illustrated in Fig. 1 thereby removing from the pin 51 the restriction imposed by the angle member 53 and positioning the chucking members 70 and 76 well out of range of the grinding wheel 22. An article 10 to be worked on is placed in position upon the chucking members 70 and 76. The electromagnet 56 is then energized to furnish magnetic force at the article engaging faces 71 and 77 to firmly hold the article 10 by magnetic attraction. In the longitudinal position just described, the chuck 55 may be moved transversely to position either one of the surfaces 16 or 17 for grinding by simply operating the lever 42 counterclockwise, thereby rotating the locking member 35 to an upward position, thus permitting unimpeded transverse adjustment of the platform 25. It will be apparent that upon clockwise rotation of the lever 42 not only is the locking member 35 rotated upward but the cam 43 also is rotated, thereby camming the pin 51 upward and into the path of the angle member 53 and preventing accidental longitudinal shifting of the table 32 to the left, thus protecting the article 10 from the grinding wheel 22 during the transverse shift. When the chuck 55 is in its proper transverse position the lever 42 is operated in a clockwise direction to rotate the locking member 35 downward and the cam 43 then permits the pin 51 to drop out of the path of the angle member 53. If the chuck 55 has been transversely positioned to permit the surface 17 to be ground first then the locking member 35 will fall between the stops 44 and 45, thus limiting the action of the grinding wheel to the area bounded by the lines indicated at 12 (Fig. 3), the distance at 12 being the same as that between the stops 44 and 45. The table 32 is then shifted to the left to subject the surface 17 to the action of the grinding wheel 22. It will be apparent that in this position accidental transverse shifting of the chuck is not possible because the angle member 53, by obstructing upward movement of the pin 51, prevents counterclockwise rotation of the cam 43 and the locking member 35. In order to grind the surface 16 the table 32 is shifted to the right until the left end of the angle member 53 is clear of the pin 51, whereupon the lever 42 is operated counterclockwise to unlock the locking mechanism so as to permit a transverse shift to position the surface 16 in line with the grinding wheel. In this position, if the lever 42 is rotated clockwise, the locking member 35 will fall between the stop 45 and the back of the apparatus, Fig. 1. To perform the grinding operation on the surface 16 the table 32 is again moved to the left bringing the surface within range of the grinding wheel.

While in the specific embodiment of the invention disclosed herein an apparatus has been described which is adapted to work on an article composed of magnetic materials spaced apart by a non-magnetic section it will be obvious that the article worked could be made entirely of magnetic material, thus obviating the necessity of using the by-pass element.

What is claimed is:

1. A magnetic chuck for holding an article having isolated magnetizable sections, said chuck comprising a magnet having two poles, one of said poles being provided with a self-aligning face capable of unlimited movement around one axis, the second of said poles being provided with a self-aligning face capable of universal movement, each of said self-aligning faces being adapted to engage a different magnetizable section of said article thereby to cooperate in holding said article without appreciably distorting or deforming it, and a magnetic by-pass element adapted to engage the separate magnetizable sections engaged by said faces, thereby to complete a low reluctance magnetic path, said by-pass element having a self-aligning face member capable of universal movement.

2. An apparatus for holding an article having isolated magnetizable sections, said apparatus comprising a pair of magnetizable chucking members, one of said chucking members having a movable self-aligning article engaging surface, said chucking members being adapted to each engage a different magnetizable section of said article, means for supplying magnetic force to said chucking members, and a magnetic by-pass element engageable with the sections of said article engaged by said chucking members thereby to form a low reluctance path between said sections, said by-pass element having a movable self-aligning article engaging surface.

3. A magnetizable chuck for holding an article having substantially isolated magnetizable portions, said chuck comprising an electromagnet having oppositely magnetizable poles each having an article engaging face, one of said faces being movable with respect to its pole, each of said faces being adapted to engage a separate magnetizable portion of said article and said movable face being adapted to align itself with said article by magnetic force in response to contact with a magnetizable portion of said article, and a magnetizable by-pass element adapted to intimately engage the magnetizable portions engaged by said faces thereby to form a low reluctance magnetic path between the last-said portions.

4. A magnetizable chuck for holding an article having substantially isolated magnetizable portions, said chuck comprising an electromagnet having oppositely magnetizable poles, each having an article engaging face adapted to engage a separate magnetizable portion of said article, and a magnetic by-pass element having article engaging faces adapted to engage the magnetizable sections of the article engaged by said pole faces thereby to form a low reluctance path, one of the article engaging faces on said by-pass element being movable with respect to said by-pass element and adapted to align itself with respect to said article in response to contact with said article.

WALTER A. BOCKISCH

REFERENCES CITED

The following references are of record in the file of this patent:

UNITED STATES PATENTS

| Number | Name | Date |
|---|---|---|
| 593,230 | Moore | Nov. 9, 1897 |
| 807,517 | Vance | Dec. 19, 1905 |
| 1,066,951 | Rowell | July 8, 1913 |
| 1,312,546 | Karasick | Aug. 12, 1919 |
| 1,343,751 | Simmons | June 15, 1920 |
| 1,507,006 | Simmons | Sept. 2, 1924 |
| 1,654,000 | Hirst | Dec. 27, 1927 |
| 1,828,791 | Thompson | Oct. 27, 1931 |
| 2,113,874 | Chanik | Apr. 12, 1938 |
| 2,347,170 | Brown et al. | Apr. 25, 1944 |
| 2,390,978 | Woodbury | Dec. 11, 1945 |

FOREIGN PATENTS

| Number | Country | Date |
|---|---|---|
| 113,568 | Great Britain | Feb. 28, 1918 |